United States Patent [19]

Sbarro

[11] 4,054,187
[45] Oct. 18, 1977

[54] WHEEL-BRAKING DEVICE FOR MOTOR VEHICLES

[76] Inventor: Francesco Sbarro, Route de Lausanne, Les Tuilleries-de-Grandson, Switzerland

[21] Appl. No.: 587,658

[22] Filed: June 17, 1975

[30] Foreign Application Priority Data

June 17, 1974 Switzerland .................. 8285/74

[51] Int. Cl.² ............................................. B60T 1/00
[52] U.S. Cl. ............................................. 188/16
[58] Field of Search ............ 188/16; 180/82 R; 74/501 R

[56] References Cited

U.S. PATENT DOCUMENTS

| | | | |
|---|---|---|---|
| 1,389,717 | 9/1921 | Von Babo | 188/16 |
| 1,593,949 | 7/1926 | Piche | 188/16 |
| 1,736,082 | 11/1929 | Houseman | 188/16 |
| 2,573,044 | 10/1951 | Morris | 188/16 |
| 3,792,746 | 2/1974 | Phillips | 188/16 |
| 3,899,048 | 8/1975 | Huvers | 188/16 |

Primary Examiner—Carlton R. Croyle
Assistant Examiner—Gregory P. LaPointe
Attorney, Agent, or Firm—Birch, Stewart, Kolasch and Birch

[57] ABSTRACT

A pivoted rocker attached to a conventional hand-brake lever enables either of two wheels of a motor vehicle to be braked via the respective brake cable and braking mechanism to aid in freeing the vehicle when that wheel is spinning for lack of traction.

4 Claims, 3 Drawing Figures

WHEEL-BRAKING DEVICE FOR MOTOR VEHICLES

BACKGROUND OF THE INVENTION

The present invention relates to a wheel braking device for motor vehicles equipped with a hand-brake lever having two brake cables connecting the hand-brake lever to respective braking mechanism for each of two wheels of the motor vehicle.

Braking devices for one wheel, especially for a motor vehicle, are intended to assist in making the vehicle mobile again when one of its wheels simply spins in place for lack of sufficient traction, as may occur when it sinks into snow, mud, or the like. Except in the case of cross-country vehicles, where each wheel can be locked by means of an appropriate design of the drive, it has been comparatively bothersome until now to free an ordinary motor vehicle under such circumstances, the usual procedure being to wedge some solid object under the spinning wheel, to spread sand under it, or the like.

SUMMARY OF THE INVENTION

Accordingly, it is the object of the present invention to provide a wheel-braking device of the aforementioned kind which is not only extremely simple but can also be readily installed on virtually any automobile.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

To this end, the wheel braking device according to the present invention comprises a two-armed pivoted rocker adapted to be secured to the hand-brake lever, each brake cable being attachable to a respective free end of each of the two arms.

BRIEF DESCRIPTION OF THE DRAWINGS

A preferred embodiment of the present invention will now be described in detail with reference to the accompanying drawings, wherein.

DETAILED DESCRIPTION

Figure 1:
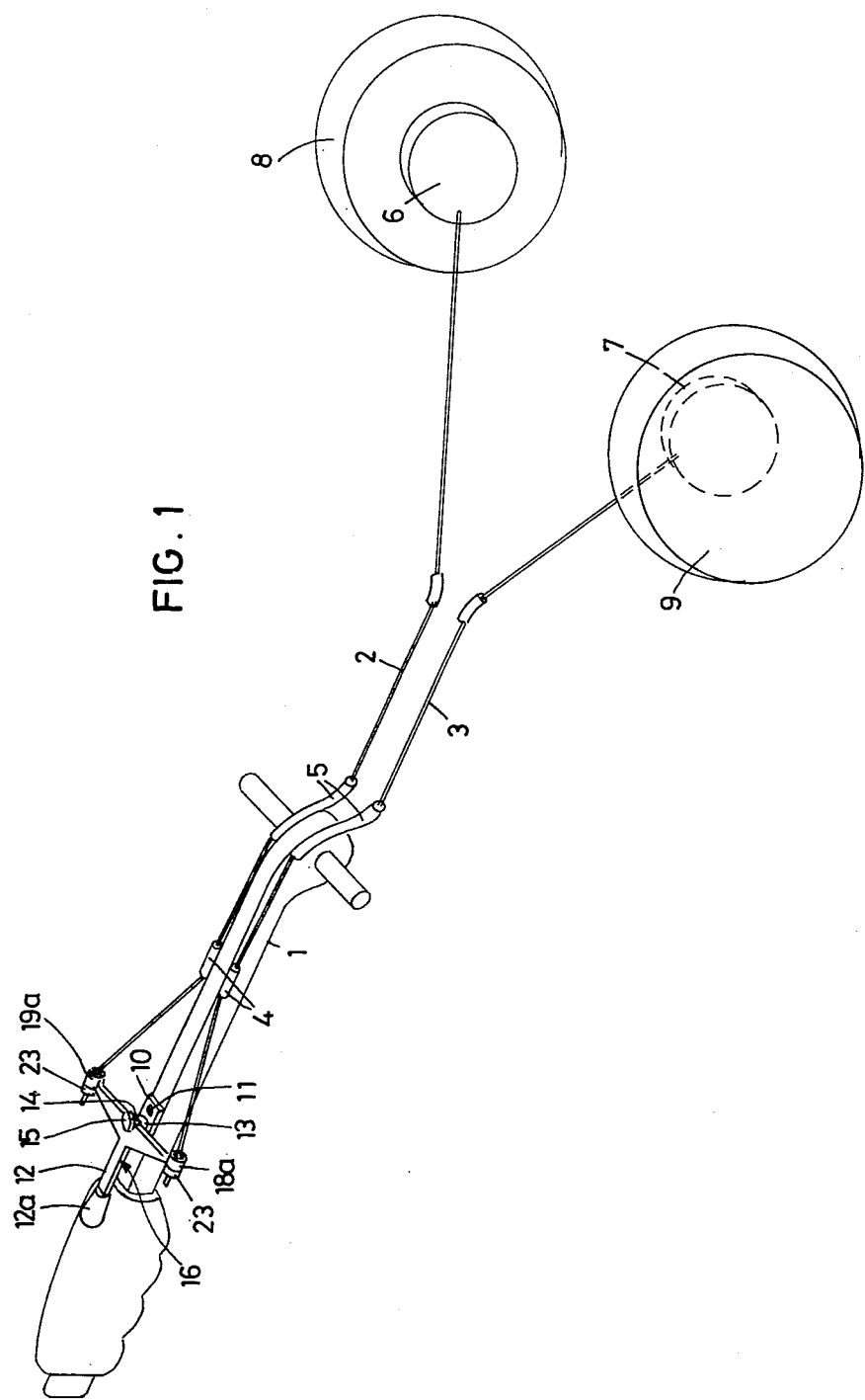
FIG. 1 is a diagrammatic perspective view of the wheel-braking device shown together with the rear wheels of an automobile which can be braked by means of a conventional hand-brake.

In the embodiment illustrated, the wheel-braking device is secured to an ordinary pivotable hand-brake lever 1 such as forms part of the equipment of most automobiles. Without the wheel-braking device, two brake cables 2 and 3 are each secured to the brake lever 1 at one end, slidingly held in guide members 4 and 5, and connected at the other end to respective braking mechanisms 6 and 7 of each of two rear wheels 8 and 9. Since the brake cables 2 and 3 are held at a certain distance from the geometrical axis of rotation of the brake lever 1 by the guide members 5, the cables 2 and 3 are customarily drawn tight by the pivoting of the hand-brake lever 1, whereby each of the braking mechanisms 6 and 7 is operated, and the wheels 8 and 9 are braked.

Figure 2:
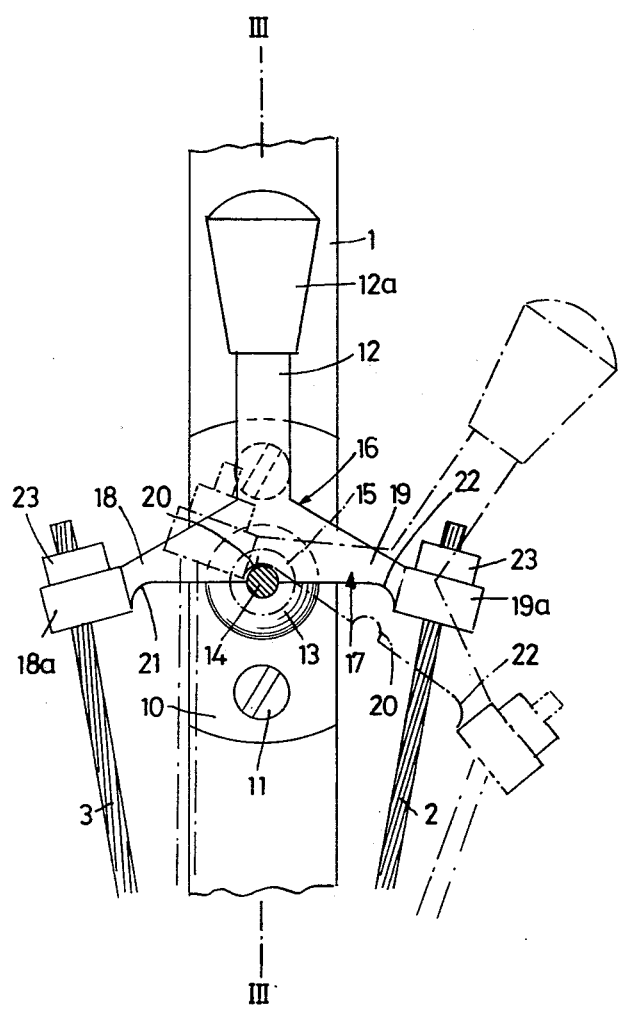
FIG. 2 is a top plan view, on a larger scale, of the wheel-braking device mounted on a hand-brake lever.
Figure 3:
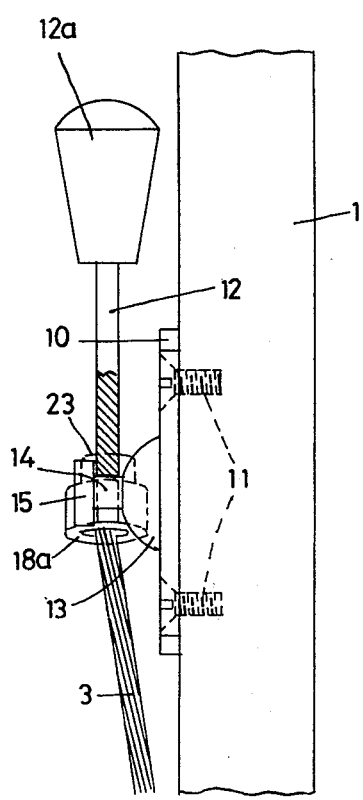
FIG. 3 is a partial section taken on the line III—III of FIG. 2.

In the embodiment shown, the wheel-braking device comprises a frame 10 which is secured by means of screws 11 to the upper side of the brake lever 1 in such a way that in the neutral position shown in FIGS. 2 and 3, a selector or control lever 12 lies approximately in the longitudinal plane of symmetry of the brake lever 1. A mounting block 13 for a pivot-pin 14 is provided on the upper side of the frame 10, and a pivoted rocker 16 is rotatably mounted between the mounting block 13 and a limiting disc 15. The pivoted rocker 16 comprises, in addition to the aforementioned control lever 12 with its control knob 12a, a two-armed braking bar 17, the two arms 18 and 19 of which project laterally away from one another symmetrically with respect to the longitudinal plane of symmetry through the control lever 12. The end portions of arms 18 and 19 are provided with bored portions 18a and 19a. The control lever 12 and the braking bar 17 are made in one piece. On the side of the braking bar 17 remote from the control lever 12, and disposed in the axis of the control lever 12, is a notch 20 into which the pivot-pin 14 enters in the neutral position indicated in solid lines in FIGS. 2 and 3. Since the end portions 18a and 19a are thicker than the remainder of the arms 18 and 19, two further, lateral notches 21 and 22 are also provided, one on the inner edge of each of the end portions 18a and 19a. In the two possible positions of extreme pivoting, one of which is drawn in in dot-dash lines in FIG. 2, the pivot-pin 14 engages in one or the other of the lateral notches 21 or 22. The end portions 18a and 19a of each arm 18 and 19 of the braking bar 17 are intended to receive the respective ends of the brake cables 2 and 3, these ends being secured there by lock nuts 23.

The device described above can, in principle, be screwed onto any automobile hand-brake lever in a very simple manner, or it may form part of the original equipment, in which case the pivot-pin 14 will be directly connected to the hand-brake lever 1.

In the neutral position shown in FIGS. 2 and 3, the effective length of both brake cables 2 and 3 is the same, so that when the hand-brake lever 1 is pivoted accordingly, the braking mechanisms 6 and 7 of the two rear wheels 8 and 9 both operate in exactly the same way as if the wheel-braking device were not present. If, however, the rocker 16 is pivoted about the pin 14 by moving the control lever 12, one of the cables will be tightened and the other slackened. In the position shown in dot-dash lines in FIG. 2, brake cable 3 is the tight one and brake cable 2 is the slack one. Now if, in this position, the hand-brake lever 1 is pivoted as for a normal braking operation, the entire braking force will be transmitted solely to the wheel 9 alone, i.e., to that wheel whose braking mechanism 7 is associated with the tightened cable 3. In this manner, the wheel 9 is braked, and due to the differential gear, the entire driving force is transmitted to the other wheel 8. Consequently, whenever a wheel is spinning in place, it suffices to brake it by pivoting the rocker 16 in the appropriate direction in order to free the vehicle and make it mobile again.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wheel-braking device for a motor vehicle equipped with a hand-brake lever having two brake cables which connect said hand-brake lever directly to respective braking mechanisms for each of two wheels of said motor vehicle, said wheel-braking device comprising:
   a selector lever containing a two-armed rocker means rotatably mounted about a neutral pivot point positioned on said hand-brake lever;
   the arms of said rocker means extending laterally from the hand-brake lever;
   the free end portion of said rocker arms being attached to said brake cables, and also provided with laterally disposed notches;
   said selector lever being selectively shiftable, laterally from said neutral pivot point to engage either of said lateral notches so that said rocker means is selectively pivotable in one of said notches about said hand-brake lever for braking one wheel of the motor vehicle and transferring the entire driving force to the other wheel thereof when the hand-brake lever is pivoted to a normal brake operating position, and
   said selector lever being selectively shiftable, laterally to a neutral notch for braking both wheels of the motor vehicle when the hand-brake is pivoted to a normal brake operating position.

2. The wheel-braking device of claim 1, wherein the selector lever is disposed in the longitudinal plane of symmetry of the brake lever.

3. The wheel braking device of claim 2, wherein the two arms of the rocker means extend laterally away from each other, symmetrically with respect to the longitudinal plane of symmetry through the selector lever.

4. The wheel braking device of claim 1, wherein the lateral notches are disposed between the brake cables attached to the free end portions of the arms of the rocker means and a neutral pivot point.